United States Patent
Kojima et al.

(10) Patent No.: US 9,335,441 B2
(45) Date of Patent: May 10, 2016

(54) RESIN COMPOSITION, FORMED ARTICLE, AND MIRROR

(71) Applicant: CANON KABUSHIKI KAISHA, Tokyo (JP)

(72) Inventors: Takahiro Kojima, Hiratsuka (JP); Katsumoto Hosokawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 13/903,481

(22) Filed: May 28, 2013

(65) Prior Publication Data

US 2013/0321942 A1   Dec. 5, 2013

(30) Foreign Application Priority Data

May 30, 2012   (JP) ................. 2012-122909

(51) Int. Cl.
| | |
|---|---|
| G02B 5/08 | (2006.01) |
| G02B 5/26 | (2006.01) |
| G02B 1/04 | (2006.01) |
| C08K 3/36 | (2006.01) |
| C08K 7/20 | (2006.01) |
| G02B 5/10 | (2006.01) |
| C08L 67/00 | (2006.01) |
| C08L 69/00 | (2006.01) |
| C08L 45/00 | (2006.01) |

(52) U.S. Cl.
CPC ... *G02B 1/04* (2013.01); *C08K 3/36* (2013.01); *C08K 7/20* (2013.01); *G02B 5/0808* (2013.01); *G02B 5/10* (2013.01); *C08K 2201/005* (2013.01); *C08L 45/00* (2013.01); *C08L 67/00* (2013.01); *C08L 69/00* (2013.01); *Y10T 428/24355* (2015.01); *Y10T 428/252* (2015.01); *Y10T 428/259* (2015.01)

(58) Field of Classification Search
CPC ........ G02B 5/0808; G02B 5/08; G02B 1/105; G02B 1/00; G02B 1/02; G02B 5/128; C08K 3/36; C08K 3/34; C08K 3/40
USPC ......................................... 359/871, 884, 883
See application file for complete search history.

(56) References Cited

U.S. PATENT DOCUMENTS

2004/0247916 A1 * 12/2004 MacDonald ............ B29C 55/06 428/523
2009/0305012 A1 * 12/2009 Song ............................ 428/212

FOREIGN PATENT DOCUMENTS

| JP | 2006-36915 A | | 2/2006 |
| JP | 2006036915 A | * | 2/2006 |

(Continued)

OTHER PUBLICATIONS

XP-002702866, Resin composition for sealing of electronic component, contains ball-shaped silica particle, silica nanoparticle, setting resin and thermoplastic resin, Mar. 26, 2013, 2 pages.

(Continued)

*Primary Examiner* — Jade R Chwasz
(74) *Attorney, Agent, or Firm* — Canon U.S.A. Inc., IP Division

(57) ABSTRACT

A formed article is made from a resin composition containing a thermoplastic resin, first inorganic particles having a mean volume diameter of primary-particle of 10 nm to 100 nm, both inclusive, and second inorganic particles having a mean volume diameter of primary-particle of 120 nm to 10000 nm, both inclusive. One hundred (100) parts by mass of the resin composition contains 9.0 to 40.5 parts by mass of the first inorganic particles and 4.5 to 36.0 parts by mass of the second inorganic particles.

17 Claims, 2 Drawing Sheets

(56) References Cited

FOREIGN PATENT DOCUMENTS

| | | | |
|---|---|---|---|
| JP | 2007-070564 | A | 3/2007 |
| JP | 2007-077235 | A | 3/2007 |
| JP | 4787549 | B2 | 10/2011 |

OTHER PUBLICATIONS

XP-055009141, Alan Rawle, Basic Principles of Particle Size Analysis, Jan. 1, 2008, 8 pages.

* cited by examiner

RESIN COMPOSITION, FORMED ARTICLE, AND MIRROR

BACKGROUND OF THE INVENTION

1. Field of the Invention

The present invention relates to a resin composition containing some inorganic particulate components with different mean diameters, an article formed from such a resin composition, and a mirror having such a formed article and a reflective layer.

2. Description of the Related Art

Some devices used in a precision optical system have organic resin components as the optical elements or surrounding components thereof. These resin-made components can cause the optical system to be misaligned when the size thereof is greatly influenced by the temperature. A known way to reduce such temperature-dependent changes in the size of a resin component is to use an organic resin material with a smaller coefficient of linear expansion.

When an organic resin material is used to make a mirror or a similar optical element, it is required to ensure the smoothness of an optically effective surface (i.e., a surface available for a certain optical application) of the optical element in addition to controlling the coefficient of linear expansion of the resin material.

Japanese Patent No. 4787549 discloses a method in which inorganic particles with a small mean diameter are added to an organic resin to reduce the coefficient of linear expansion of the organic resin material while ensuring the smoothness of the optically effective surface of articles formed from that material. The publication states that in this method inorganic particles having a mean diameter of 18 nm or less are added to an organic resin to produce a resin material with a reduced coefficient of linear expansion, the resulting resin material is injected into a mold into which a heated gas stream has been introduced, and a formed article is obtained with a coefficient of linear expansion of $18 \times 10^{-6}/°$ C. or less.

Japanese Patent Laid-Open No. 2006-36915 discloses a resin composition that can be used to seal electronic components. This resin composition contains two kinds of silica particles with different mean diameters.

Adding particles with a small diameter to a thermoplastic resin as a matrix, however, increases the melt viscosity of the resulting material. An increased melt viscosity causes some problems such as poor formability of the material in injection molding and other molding processes. The resin material used in the method disclosed in Japanese Patent No. 4787549 therefore has insufficient formability.

The resin composition disclosed in Japanese Patent Laid-Open No. 2006-36915 also lacks sufficient formability because of the high inorganic particle content and the consequent high melt viscosity. Furthermore, articles formed from this resin composition are unsatisfactory in terms of surface smoothness.

SUMMARY OF THE INVENTION

An aspect of the present invention provides a mirror having at least a formed article and a reflective layer. The formed article is made from a resin composition containing inorganic particles. The resin composition has a small coefficient of linear expansion, and exhibits a melt viscosity low enough for practical thermoforming despite the presence of the inorganic particles. Furthermore, the formed article has a surface smooth enough for practical applications.

Another aspect of the present invention provides a resin composition containing inorganic particles. The resin composition has a small coefficient of linear expansion, and exhibits a melt viscosity low enough for practical thermoforming despite the presence of the inorganic particles.

Yet another aspect of the present invention provides a formed article made from a resin composition containing inorganic particles. The resin composition has a small coefficient of linear expansion, and exhibits a melt viscosity low enough for practical thermoforming despite the presence of the inorganic particles.

An aspect of the present invention is directed to a formed article made from a resin composition containing at least a thermoplastic resin, first inorganic particles having a mean volume diameter of primary-particle of 10 nm to 100 nm, both inclusive, and second inorganic particles having a mean volume diameter of primary-particle of 120 nm to 10000 nm, both inclusive. One hundred (100) parts by mass of the resin composition contains 9.0 to 40.5 parts by mass of the first inorganic particles and 4.5 to 36.0 parts by mass of the second inorganic particles.

Another aspect of the present invention is directed to a resin composition containing at least a thermoplastic resin, first inorganic particles having a mean volume diameter of primary-particle of 10 nm to 100 nm, both inclusive, and second inorganic particles having a mean volume diameter of primary-particle of 120 nm to 10000 nm, both inclusive. One hundred (100) parts by mass of the resin composition contains 9.0 to 40.5 parts by mass of the first inorganic particles and 4.5 to 36.0 parts by mass of the second inorganic particles.

Yet another aspect of the present invention is directed to a mirror having at least a formed article made from a resin composition and a reflective layer on an optically effective surface of the formed article. The resin composition contains at least a thermoplastic resin, first inorganic particles having a mean volume diameter of primary-particle of 10 nm to 100 nm, both inclusive, and second inorganic particles having a mean volume diameter of primary-particle of 120 nm to 10000 nm, both inclusive. One hundred (100) parts by mass of the resin composition contains 9.0 to 40.5 parts by mass of the first inorganic particles and 4.5 to 36.0 parts by mass of the second inorganic particles.

The resin composition according to an aspect of the present invention has a small coefficient of linear expansion and good formability, and articles formed therefrom have a small surface roughness. The mirror according to another aspect of the present invention is unlikely to undergo dimensional changes associated with temperature changes and thus helps to prevent an optical system from being misaligned.

Further features of the present invention will become apparent from the following description of exemplary embodiments with reference to the attached drawings.

DESCRIPTION OF THE EMBODIMENTS

The following describes some embodiments of the present invention in detail.

An aspect of the present invention is directed to a formed article made from a resin composition containing at least a thermoplastic resin, first inorganic particles having a mean volume diameter of primary-particle of 10 nm to 100 nm, both inclusive, and second inorganic particles having a mean volume diameter of primary-particle of 120 nm to 10000 nm, both inclusive.

Figure 1:
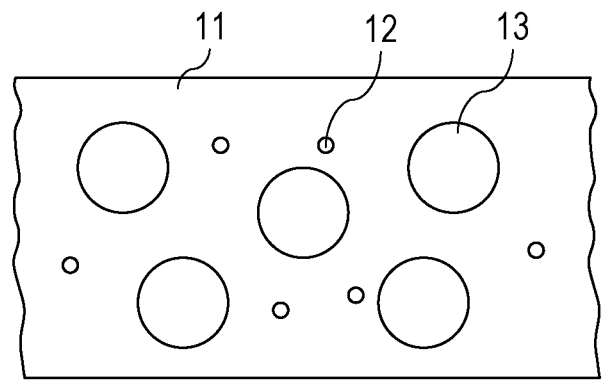
FIG. 1 is a schematic diagram of a resin composition according to an aspect of the present invention.

As illustrated in the schematic diagram of FIG. 1, the resin composition according to this aspect of the invention contains a thermoplastic resin 11 and predetermined amounts of first inorganic particles 12 and second inorganic particles 13 with different diameters. The inventors found that with appropriate mean volume diameters and content levels of the first inorganic particles 12 and the second inorganic particles 13, the resin composition can be formed into articles with a small coefficient of linear expansion, a small surface roughness, low viscosity, and good formability.

Thermoplastic Resin

The resin composition according to this aspect of the invention contains a thermoplastic resin and thus can be easily formed into articles by heating. Among other thermoplastic resins, polycarbonate resins, polyester resins, and cycloolefin polymers have good mechanical properties and heat resistance. Cycloolefin polymers also have low hygroscopicity.

Specific examples of polycarbonate resins that can be used include Iupilon [trade name] (Mitsubishi Engineering-Plastics Corporation), Panlite [trade name] (Teijin Chemicals Ltd.), and TARFLON [trade name] (Idemitsu Kosan Co., Ltd.). Specific examples of polyester resins that can be used include OKP [trade name] (Osaka Gas Chemicals Co., Ltd.). Specific examples of cycloolefin polymers that can be used include ZEONEX [trade name] (ZEON Corporation), ZEONOR [trade name] (ZEON Corporation), and APEL [trade name] (Mitsui Chemicals, Inc.).

The resin composition according to this aspect of the invention may contain any additive unless the additive undermines the intended advantages of the composition. Examples of additives that can be used include the following: heat stabilizers such as phosphorus-based ones and hydroxylamines; antioxidants such as hindered phenols; photostabilizers such as hindered amines; ultraviolet absorbers such as benzotriazoles, triazines, benzophenones, and benzoates; plasticizers such as phosphoric acid esters, phthalic acid esters, citric acid esters, and polyesters; release agents such as silicones; flame retardants such as phosphoric acid esters and melamines; fatty acid ester surfactants; antistatic agents such as alkyl sulfonic acid salts and glyceryl stearates; organic pigment colorants; and impact modifiers. One or a combination of such additives can be used.

Inorganic Particles

The resin composition according to this aspect of the invention contains first inorganic particles having a mean volume diameter of primary-particle of 10 nm to 100 nm, both inclusive, and second inorganic particles having a mean volume diameter of primary-particle of 120 nm to 10000 nm, both inclusive. The inorganic particulate components (i.e., the first inorganic particles and the second inorganic particles) may be of the same composition or a combination of particulate components sharing the same composition but synthesized by different processes. It is also possible to use two or more particulate components with different compositions.

Each inorganic particulate component can be of any composition; for example, particles of metals, metal oxides, and metal nitrides can be used. Among others, metal oxides with the stable oxidation number for the metal element are easy to synthesize and able to remain stable during long-term storage. Examples of metal oxides that can be used in practical applications include silicon oxide as well as aluminum oxide, titanium oxide, iron oxide, and zirconium oxide, and metal-salt-doped ones containing a small amount of sodium or any other alkali component. Mixed particles of such substances or particles of a composite oxide can also be used. Specific examples include, among others, silica particles and glass beads.

The mean volume diameter of primary-particle of the first inorganic particles is preferably in the range of 10 nm to 100 nm, both inclusive, more preferably 10 nm to 70 nm, both inclusive. A mean volume diameter of primary-particle of the first inorganic particles smaller than 10 nm can cause the surface area of the boundary between the first inorganic particles and the thermoplastic resin to be too large, making the melt viscosity of the resin composition too high. On the other hand, a mean volume diameter of primary-particle of the first inorganic particles as large as more than 100 nm can make it difficult to effectively fill the interstices of the particles. In such a case the thermal expansion of the interstices left unfilled will not be negligible, and the surface roughness of the articles formed from the resin composition will have been inevitably affected by the temperature changes during the forming process. As a result, the formed articles will often have a rough surface.

The mean volume diameter of primary-particle of the second inorganic particles is preferably in the range of 120 nm to 10000 nm, both inclusive. A mean volume diameter of primary-particle of the second inorganic particles smaller than 120 nm can cause the collision rate of the inorganic particles during melt flow to be too high, making the melt viscosity of the resin composition too high. On the other hand, a mean volume diameter of primary-particle of the second inorganic particles as large as more than 10000 nm can cause the interstices of the second inorganic particles to be too large, making it difficult to compensate for the difference in thermal expansion between the interstices and the particles themselves by filling the interstices with the first inorganic particles. In such a case the surface roughness of the articles formed from the resin composition will have been inevitably affected by the temperature changes while the formed articles will be cooled. As a result, the formed articles will often have a rough surface.

When in a volume diameter distribution of the inorganic particulate components the peak heights of the first inorganic particles and the second inorganic particles are defined as $H_1$ and $H_2$, respectively, it is possible that the range of the volume diameter of the first inorganic particles at a height of $\frac{1}{2}H_1$ is separate from that of the second inorganic particles at a height of $\frac{1}{2}H_2$. An overlap of these two ranges of the volume diameter can cause reduced formability of the resin composition.

The first inorganic particles can be produced by various methods, including putting an inorganic powder into a high-temperature flame in an oxygen atmosphere, hydrolyzing a metal alkoxide in the presence of a catalyst and dehydrating the product by a sol-gel process, and so forth. The second inorganic particles can also be prepared by various methods, including pulverizing a bulk inorganic substance by physical means such as a mortar and pestle, a stamp mill, or a cutting mill and classifying and screening the resulting particles, in addition to ones that can be used to produce the first inorganic particles.

The resin composition according to this aspect of the invention contains 9.0 to 40.5 parts by mass of the first inorganic particles and 4.5 to 36.0 parts by mass of the second inorganic particles per 100 parts by mass of the resin composition. The total content of the first and second inorganic particulate components is preferably in the range of 15 parts by mass to 70 parts by mass, both inclusive, more preferably 15 parts by mass to 65 parts by mass, both inclusive, much more preferably 15 parts by mass to 60 parts by mass, both inclusive. A total content of the first and second inorganic particulate components lower than the above range can result in an insufficiently reduced coefficient of linear expansion of articles formed from the resin composition. On the other hand, a total content of the first and second inorganic particulate components higher than the above range can cause the melt viscosity of the resin composition to be too high, leading to problems such as incomplete filling of the resin composition in injection molding or reduced smoothness of the optically effective surface of articles formed from the resin composition. The total content of the first and second inorganic particulate components in the resin composition can be determined using, among others, a thermogravimetric analyzer (TGA) with which a sample of the resin composition can be heated to a temperature of 750° C. in a nitrogen atmosphere and the percent residual weight can be measured thereafter.

Each inorganic particulate component used in this aspect of the invention can have any kind of surface functional group. For example, it is possible to select ones suitable for the desired characteristics of the resin composition or articles formed from the resin composition such as the coefficient of linear expansion, surface smoothness, melt viscosity, and the dispersity of the particle, and the particles can have one or two or more known functional groups on the outermost surface thereof. Examples of functional groups that can be used include the following: alkyl and cycloalkyl groups such as methyl, ethyl, n-propyl, isopropyl, n-butyl, isobutyl, t-butyl, n-hexyl, cyclohexyl, octyl, decyl, and hexadecyl groups; aryl groups such as a phenyl group; halogenated alkyl groups such as chloromethyl, chloropropyl, fluoromethyl, and fluoropropyl groups; vinyl, styryl, acryloyl, methacryloyl, glycidyl, epoxycyclohexyl, isocyanate, amino, ureido, mercapto, and sulfide groups; and hydroxyl groups such as silanol. Among others, particles having one or two or more of the following on the outermost surface thereof are highly effective in reducing defects that can occur while articles are formed from the resin composition: alkyl and cycloalkyl groups such as methyl, ethyl, n-propyl, isopropyl, n-butyl, isobutyl, t-butyl, n-hexyl, cyclohexyl, octyl, decyl, and hexadecyl groups; aryl groups such as a phenyl group; and hydroxyl groups such as silanol.

Inorganic particles having such a surface functional group or groups can be obtained by any surface modification process. For example, it is possible to carry out a known surface modification process such as acid-base reaction or hydrolysis by using one or two or more silicon-containing compounds selected from chlorosilanes, alkoxysilanes, silylamines, hydrosilanes, and polyorganosiloxanes having such groups as the above.

Process for Producing the Resin Composition

A process for producing the resin composition according to this aspect of the invention includes mixing a thermoplastic resin, first inorganic particles having a mean volume diameter of primary-particle of 10 nm to 100 nm, both inclusive, and second inorganic particles having a mean volume diameter of primary-particle of 120 nm to 10000 nm, both inclusive, in a way that 100 parts by mass of the resin composition contains 9.0 to 40.5 parts by mass of the first inorganic particles and 4.5 to 36.0 parts by mass of the second inorganic particles.

The thermoplastic resin and the inorganic particulate components can be mixed by any known mixing technique. For example, it is possible to dissolve or disperse and mix the thermoplastic resin and the inorganic particulate components in an organic solvent such as acetone, tetrahydrofuran, methylene chloride, chloroform, dimethylformamide, toluene, or xylene and then distill off the organic solvent under reduced pressure and/or heat conditions. This mixing operation can also be done without using a mixed medium by mixing the three ingredients by a known melt dispersion technique using a roll mill, a kneader, a mixer, a twin-screw extruder, or a multiple-screw extruder.

A melt dispersion process to mix the thermoplastic resin and the inorganic particulate components includes putting the particulate components into a powder, pellets, or a melted form of the thermoplastic resin and then applying shear force to the mixture under heat conditions to disperse the inorganic particles in the thermoplastic resin. The inorganic particulate components can be directly added as a powder or dispersed in a liquid in advance. The use of a dispersion of the inorganic particulate components may require that the melt dispersion device have a mechanism for removing the solvent from the dispersion, e.g., a vent. The melting atmosphere can be an inert gas such as nitrogen so that the resin should not degrade while being heated to melt.

The first and second inorganic particulate components can be added to the thermoplastic resin at any time and in any order. It is both possible to add two or more particulate components at the same time and to add the particulate components in a sequence according to dispersibility or the increase in viscosity, for example.

Formed Article

The formed article according to another aspect of the present invention is formed from a resin composition. The formed article contains a thermoplastic resin and predetermined amounts of first inorganic particles and second inorganic particles dispersed therein. The formed article can have a mean coefficient of linear expansion of $50 \times 10^{-6}/°$ C. or less, preferably $40 \times 10^{-6}/°$ C. or less, in the temperature range of 0° C. to 80° C. A surface of the formed article can have a root mean square surface roughness (Rq) of 10 nm or less.

The formed article may be of any shape such as a sphere, a bar, a plate, a block, a cylinder, a spindle, fiber, a grid, a film, or a sheet and can be used as an interior and exterior finish for various instruments or as an optical element or a surrounding component in a precision optical system or any similar optical device, for example.

Process for Producing the Formed Article

A process for producing the formed article according to this aspect of the invention includes, after producing the resin composition in such a way as described above, forming the resin composition into the article.

Figure 2:
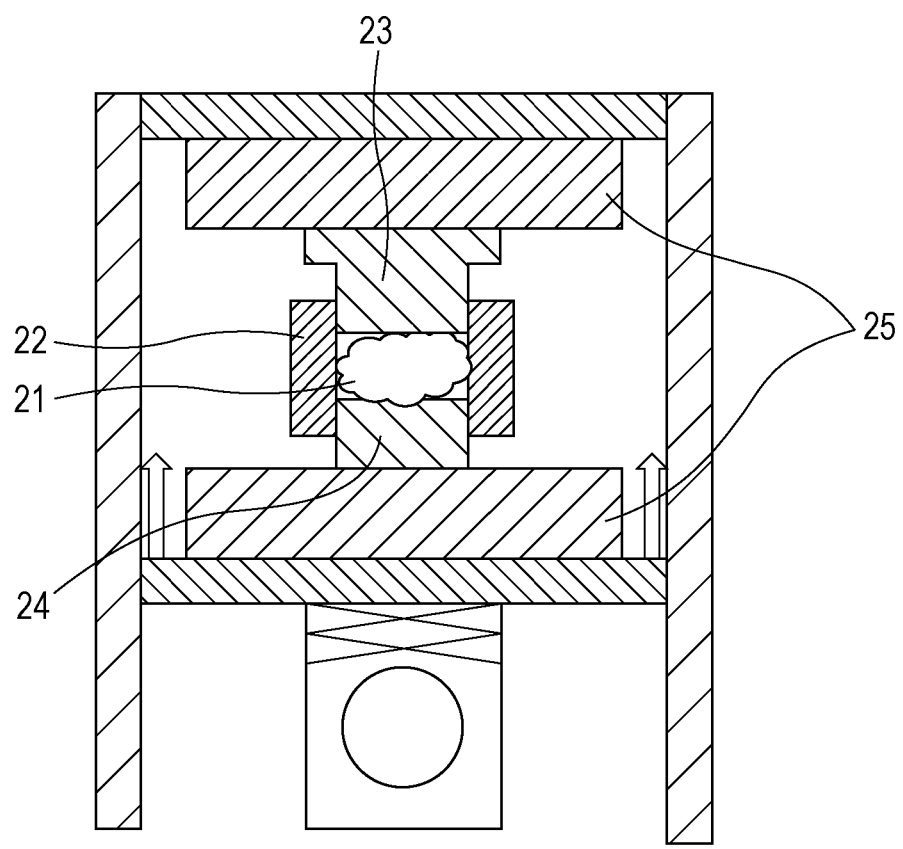
FIG. 2 illustrates a processing machine for the production of a formed article according to another aspect of the present invention.

The resin composition can be formed into any desired shape by a known method such as injection molding or heat pressing. FIG. 2 illustrates a heat press by way of example. This heat press can form the resin composition 21 into a predetermined shape using the upper and lower mold sections 23 and 24 heated by heating plates 25 and a cylindrical mold section 22.

The surface roughness of the surface of the mold corresponding to the optically effective surface of the formed article can be 10 nm or less as measured by the root mean square surface roughness (Rq).

The forming temperature for the resin composition can be in the range of 180° C. to 320° C., both inclusive. Too low a forming temperature can cause a failure to form the resin composition into the desired shape, while too high a forming temperature can cause heat decomposition that leads to a yellowed article being formed or too large a coefficient of linear expansion. When the resin composition is formed by injection molding, the holding pressure can be 50 MPa or more so that the profile of the mold can be transferred to the article, although not limited to any particular range.

Mirror

The inventors found that mirrors for the components of optical devices, such as those for the scanning unit of multifunction devices or printers, can have a surface roughness of 10 nm or less as measured by the root mean square surface roughness (Rq) while achieving a small coefficient of linear expansion.

The mirror according to yet another aspect of the present invention has at least a formed article made from a resin composition and a reflective layer on an optically effective surface of the formed article. The resin composition contains at least a thermoplastic resin, first inorganic particles having a mean volume diameter of primary-particle of 10 nm to 100 nm, both inclusive, and second inorganic particles having a mean volume diameter of primary-particle of 120 nm to 10000 nm, both inclusive. One hundred (100) parts by mass of the resin composition contains 9.0 to 40.5 parts by mass of the first inorganic particles and 4.5 to 36.0 parts by mass of the second inorganic particles. The first and second inorganic particulate components can be, among others, silica particles or glass beads.

When in a volume diameter distribution the peak heights of the first inorganic particles and the second inorganic particles are defined as $H_1$ and $H_2$, respectively, it is possible that the range of the volume diameter of the first inorganic particles at a height of $½H_1$ is separate from that of the second inorganic particles at a height of $½H_2$.

The mirror has a reflective layer on an optically effective surface of the formed article, and this reflective layer can be a layer of aluminum or any similar material formed by vapor deposition or a similar technique, multi-layered reflection coatings, or one made by any other known method. The mirror may also have other layers for better characteristics of the reflective layer such as controlled reflectivity, resistance to oxidation, surface coating, and improved adhesion. Examples of materials that can be used for such purposes include copper, titanium oxide, aluminum oxide, silicon oxide, and amorphous fluoropolymers.

The optically effective surface of the formed article can have a root mean square surface roughness (Rq) of 10 nm or less.

The formed article can have a mean coefficient of linear expansion of $50 \times 10^{-6}/°$ C. or less, preferably $40 \times 10^{-6}/°$ C. or less, in the temperature range of 20° C. to 60° C.

The thermoplastic resin used in this mirror as a component of the formed article can be a cycloolefin polymer; cycloolefin polymers have low hygroscopicity.

Figure 3:
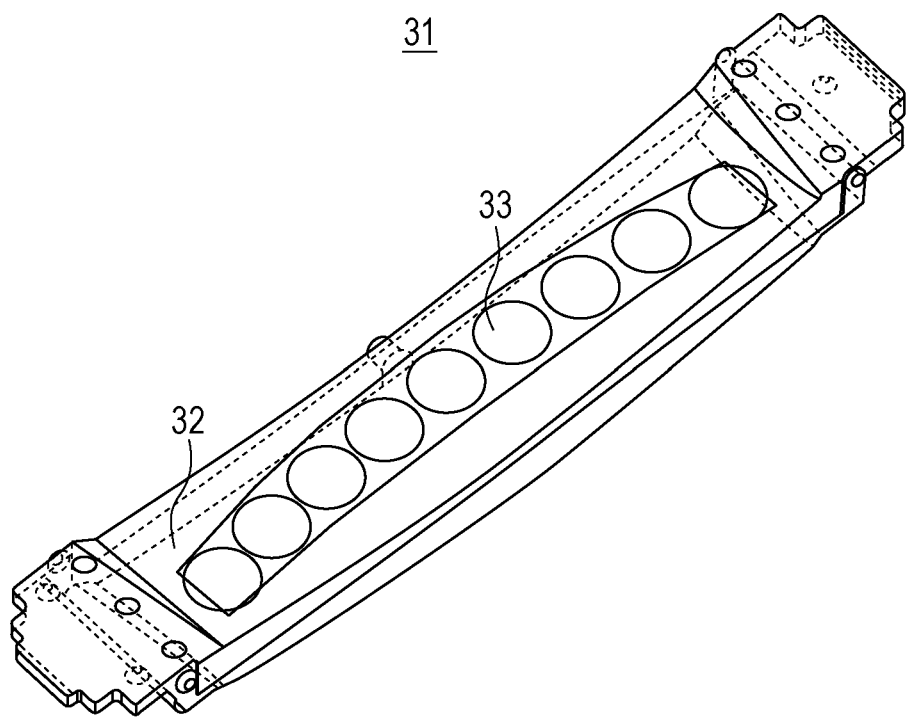
FIG. 3 is a diagram illustrating an example of a mirror according to yet another aspect of the present invention installed in the scanning unit of a multifunction device.

The scanning unit of a multifunction device is required to have a small coefficient of linear expansion and a small surface roughness to produce high-quality images, and this mirror can be used in such a unit. FIG. 3 illustrates an example of a mirror installed in the scanning unit of a multifunction device. The scanning unit 31 of the multifunction device has a reflective layer 33 on an optically effective surface of a formed article 32 made from a resin composition. The term multifunction device, as used herein, refers to a machine incorporating the functionality of at least two of the following: a photocopier, a printer, an image scanner, and a facsimile machine.

Process for Producing the Mirror

A process for producing the mirror according to this aspect of the invention includes, after producing the formed article in such a way as described above, forming the reflective layer on an optically effective surface of the formed article.

The thermoplastic resin used as the base material of the mirror can be an amorphous resin. Amorphous resins are unlikely to undergo volume changes associated with cooling and curing and thus are easy to form into articles with high dimensional accuracy. Furthermore, many of amorphous resins have relatively low hygroscopicity and thus are effective in preventing the dimensional changes caused by hygroscopic expansion, i.e., an increase in size of a piece of resin due to water absorption.

EXAMPLES

The following illustrates some examples and comparative examples of the present invention to describe some aspects of the invention in more detail. These examples should not be construed as limiting any aspect of the invention.

Example 1

Pellets of a cycloolefin polymer (ZEONEX E48R [trade name], ZEON Corporation), a 9.0 mass %-equivalent of silica particles having a mean volume diameter of primary-particle of 40 nm (AEROSIL OX 50 [trade name], Nippon Aerosil Co., Ltd.), and a 36.0 mass %-equivalent of silica particles having a mean volume diameter of primary-particle of 120 nm (NSS-3N [trade name] silica filler, Tokuyama Corporation) were put into a dispersion kneader (DRV1-5 MB-E [trade name], Moriyama Co., Ltd.). The ingredients were then kneaded and homogenized with an initial-phase temperature of 210° C. and a rotation speed of 30 rpm to produce a resin composition.

In a volume diameter distribution of the inorganic particulate components, the range of the volume diameter of the first inorganic particles at a height of $½H_1$ was separate from that of the second inorganic particles at a height of $½H_2$ ($H_1$ and $H_2$ denote the peak heights of the first inorganic particles and the second inorganic particles, respectively).

The resin composition was subjected to uniaxial pressing using AS ONE Corporation AH-2003 [trade name] desktop heat press. A cylindrical mold section with an inner diameter of 10 mm containing 0.35 g of the resin composition was closed at the top and bottom with flat and mirror-polished mold sections having the same diameter as the inner diameter of the cylinder and a surface roughness (Rq) of 7 nm. The resin composition was then compressed between the upper and lower mirror surfaces at a pressure of 200 MPa and a temperature of 200° C. for 5 minutes. The mold was then allowed to cool under a holding pressure, and the pressure was released at a temperature of 90° C. In this way, a disk-shaped article was obtained.

The obtained article was tested in the following way.

The inorganic particle content was measured using a TGA (Q500 [trade name], TA Instruments Japan, Inc.). A sample taken from the formed article was heated to a temperature of 750° C. in a nitrogen atmosphere, and the percent residual weight was measured. Note that for this and the other measurements, a sample was prepared by cutting the formed article in an appropriate size where necessary.

The mean coefficient of linear expansion in the temperature range 0° C. to 80° C. was measured using a thermomechanical analyzer (TMA; Q400 [trade name], TA Instruments Japan, Inc.) by putting a sample under 3 cycles of heat stress in the temperature range of 0° C. to 80° C. The mean amount of expansion was then determined for the range of 20° C. to 60° C. by calculation. The mean coefficient of linear expansion in the thickness direction in the temperature range of 20° C. to 60° C. was $40 \times 10^{-6}$/° C.

The root mean square surface roughness (Rq) was measured using ZYGO Corporation NewView 5000 [trade name]. A 0.1-mm square area near the middle of the disk-shaped article having a diameter of 10 mm was observed, and the measured surface profile of this area was used to determine the surface roughness Rq.

The viscosity was measured using Reologica VISCOANALYSER VAR100 [trade name]. Two 8-mm diameter plates heated to a temperature of 290° C. were placed with a gap therebetween, and the gap was filled with fragments of the formed article until the gap thickness reached 1 mm. A shear rate sweep was run with these plates, and the stress at a shear rate of $1.0\ s^{-1}$ was measured. The measured stress was converted into a viscosity.

Example 2

A resin composition was prepared by the same process as in Example 1 except that the second inorganic particles, i.e., a 36.0 mass %-equivalent of silica particles having a mean volume diameter of primary-particle of 120 nm (NSS-3N [trade name] silica filler, Tokuyama Corporation), were changed to a 36.0 mass %-equivalent of glass beads having a mean volume diameter of primary-particle of 5000 nm (EMB-10 [trade name], Potters-Ballotini Co., Ltd.). An article was formed from this resin composition and tested in the way described above.

Example 3

A resin composition was prepared by the same process as in Example 2 except that pellets of a polycarbonate resin (Panlite AD-5503 [trade name], Teijin Chemicals Ltd.) were used instead of pellets of a cycloolefin polymer (ZEONEX E48R [trade name], ZEON Corporation). An article was formed from this resin composition and tested in the way described above.

Comparative Example 1

A resin composition was prepared by the same process as in Example 1 except that a 45.0 mass %-equivalent of silica particles having a mean volume diameter of primary-particle of 40 nm (AEROSIL OX 50 [trade name], Nippon Aerosil Co., Ltd.) was used as the only particulate component. An article was formed from this resin composition and tested in the way described above.

Comparative Example 2

A resin composition was prepared by the same process as in Example 1 except that a 45.0 mass %-equivalent of silica particles having a mean volume diameter of primary-particle of 120 nm (NSS-3N [trade name] silica filler, Tokuyama Corporation) was used as the only particulate component. An article was formed from this resin composition and tested in the way described above.

Comparative Example 3

A resin composition was prepared by the same process as in Example 1 except that a 45.0 mass %-equivalent of glass beads having a mean volume diameter of primary-particle of 5000 nm (EMB-10 [trade name], Potters-Ballotini Co., Ltd.) was used as the only particulate component. An article was formed from this resin composition and tested in the way described above.

Comparative Example 4

A resin composition was prepared by the same process as in Example 3 except that a 45.0 mass %-equivalent of silica particles having a mean volume diameter of primary-particle of 40 nm (AEROSIL OX 50 [trade name], Nippon Aerosil Co., Ltd.) was used as the only particulate component. An article was formed from this resin composition and tested in the way described above.

Comparative Example 5

A resin composition was prepared by the same process as in Example 3 except that a 45.0 mass %-equivalent of glass beads having a mean volume diameter of primary-particle of 5000 nm (EMB-10 [trade name], Potters-Ballotini Co., Ltd.) was used as the only particulate component. An article was formed from this resin composition and tested in the way described above.

Comparative Example 6

A resin composition was prepared by the same process as in Example 1 except that the combination of particulate components was changed to a 9.0 mass %-equivalent of silica particles having a mean volume diameter of primary-particle of 40 nm (AEROSIL OX 50 [trade name], Nippon Aerosil Co., Ltd.) and a 36.0 mass %-equivalent of silica particles having a mean volume diameter of primary-particle of 70 nm (NSS-5N [trade name] silica filler, Tokuyama Corporation). An article was formed from this resin composition and tested in the way described above.

Comparative Example 7

A resin composition was prepared by the same process as in Example 2 except that a 9.0 mass %-equivalent of silica particles having a mean volume diameter of primary-particle of 7 nm (AEROSIL 300 [trade name], Nippon Aerosil Co., Ltd.) was used instead of a 9.0 mass %-equivalent of silica particles having a mean volume diameter of primary-particle of 40 nm (AEROSIL OX 50 [trade name], Nippon Aerosil Co., Ltd.). An article was formed from this resin composition and tested in the way described above.

Example 4

A resin composition was prepared by the same process as in Example 2 except that a 9.0 mass %-equivalent of silica particles having a mean volume diameter of primary-particle of 12 nm (AEROSIL 200 [trade name], Nippon Aerosil Co., Ltd.) was used instead of a 9.0 mass %-equivalent of silica particles having a mean volume diameter of primary-particle of 40 nm (AEROSIL OX 50 [trade name], Nippon Aerosil Co., Ltd.). An article was formed from this resin composition and tested in the way described above.

Example 5

A resin composition was prepared by the same process as in Example 2 except that a 9.0 mass %-equivalent of silica particles having a mean volume diameter of primary-particle of 70 nm (NSS-5N [trade name] silica filler, Tokuyama Corporation) was used instead of a 9.0 mass %-equivalent of silica particles having a mean volume diameter of primary-particle of 40 nm (AEROSIL OX 50 [trade name], Nippon Aerosil Co., Ltd.). An article was formed from this resin composition and tested in the way described above.

Comparative Example 8

A resin composition was prepared by the same process as in Example 2 except that a 9.0 mass %-equivalent of silica particles having a mean volume diameter of primary-particle of 120 nm (NSS-3N [trade name] silica filler, Tokuyama Corporation) was used instead of a 9.0 mass %-equivalent of silica particles having a mean volume diameter of primary-particle of 40 nm (AEROSIL OX 50 [trade name], Nippon Aerosil Co., Ltd.). An article was formed from this resin composition and tested in the way described above.

Example 6

A resin composition was prepared by the same process as in Example 2 except that a 36.0 mass %-equivalent of silica particles having a mean volume diameter of primary-particle of 700 nm (SS-07 [trade name] sol-gel silica, Tokuyama Corporation) was used instead of a 36.0 mass %-equivalent of glass beads having a mean volume diameter of primary-particle of 5000 nm (EMB-10 [trade name], Potters-Ballotini Co., Ltd.). An article was formed from this resin composition and tested in the way described above.

Example 7

A resin composition was prepared by the same process as in Example 2 except that a 36.0 mass %-equivalent of glass beads having a mean volume diameter of primary-particle of 10000 nm (EMB-20 [trade name], Potters-Ballotini Co., Ltd.) was used instead of a 36.0 mass %-equivalent of glass beads having a mean volume diameter of primary-particle of 5000 nm (EMB-10 [trade name], Potters-Ballotini Co., Ltd.). An article was formed from this resin composition and tested in the way described above.

Comparative Example 9

A resin composition was prepared by the same process as in Example 2 except that a 36.0 mass %-equivalent of glass beads having a mean volume diameter of primary-particle of 50000 nm (GB301S [trade name], Potters-Ballotini Co., Ltd.) was used instead of a 36.0 mass %-equivalent of glass beads having a mean volume diameter of primary-particle of 5000 nm (EMB-10 [trade name], Potters-Ballotini Co., Ltd.). An article was formed from this resin composition and tested in the way described above.

Comparative Example 10

A resin composition was prepared by the same process as in Example 2 except that the amounts of the particulate components were changed to a 4.5 mass %-equivalent of silica particles having a mean volume diameter of primary-particle of 40 nm (AEROSIL OX 50 [trade name], Nippon Aerosil Co., Ltd.) and a 40.5 mass %-equivalent of glass beads having a mean volume diameter of primary-particle of 5000 nm (EMB-10 [trade name], Potters-Ballotini Co., Ltd.). An article was formed from this resin composition and tested in the way described above.

Example 8

A resin composition was prepared by the same process as in Example 2 except that the amounts of the particulate components were changed to an 18.0 mass %-equivalent of silica particles having a mean volume diameter of primary-particle of 40 nm (AEROSIL OX 50 [trade name], Nippon Aerosil Co., Ltd.) and a 27.0 mass %-equivalent of glass beads having a mean volume diameter of primary-particle of 5000 nm (EMB-10 [trade name], Potters-Ballotini Co., Ltd.). An article was formed from this resin composition and tested in the way described above.

Example 9

A resin composition was prepared by the same process as in Example 2 except that the amounts of the particulate components were changed to a 27.0 mass %-equivalent of silica particles having a mean volume diameter of primary-particle of 40 nm (AEROSIL OX 50 [trade name], Nippon Aerosil Co., Ltd.) and an 18.0 mass %-equivalent of glass beads having a mean volume diameter of primary-particle of 5000 nm (EMB-10 [trade name], Potters-Ballotini Co., Ltd.). An article was formed from this resin composition and tested in the way described above.

Example 10

A resin composition was prepared by the same process as in Example 2 except that the amounts of the particulate components were changed to a 36.0 mass %-equivalent of silica particles having a mean volume diameter of primary-particle of 40 nm (AEROSIL OX 50 [trade name], Nippon Aerosil Co., Ltd.) and a 9.0 mass %-equivalent of glass beads having a mean volume diameter of primary-particle of 5000 nm (EMB-10 [trade name], Potters-Ballotini Co., Ltd.). An article was formed from this resin composition and tested in the way described above.

Example 11

A resin composition was prepared by the same process as in Example 2 except that the amounts of the particulate components were changed to a 40.5 mass %-equivalent of silica particles having a mean volume diameter of primary-particle of 40 nm (AEROSIL OX 50 [trade name], Nippon Aerosil Co., Ltd.) and a 4.5 mass %-equivalent of glass beads having a mean volume diameter of primary-particle of 5000 nm (EMB-10 [trade name], Potters-Ballotini Co., Ltd.). An article was formed from this resin composition and tested in the way described above.

Example 12

Each of the resin compositions prepared in Examples 1 to 11 was formed into an article, and a reflective layer was formed on an optically effective surface of this article. In this way, mirrors were fabricated. Each of the mirrors was installed in iR 3245 digital multifunctional device (trade name, Canon Inc.). With all mirrors, good image quality was achieved.

Test Results

Table summarizes test results for Examples 1 to 11 and Comparative Examples 1 to 10.

TABLE

| | Resin | Mean volume diameter of 1st particles [nm] | Mean volume diameter of 2nd particles [nm] | Ranges of the diameter at half maximum separate or overlapping | Viscosity at 290° C. [Pa·s] | Surface roughness Rq [nm] | Coefficient of linear expansion [$10^{-6}$/° C.] |
|---|---|---|---|---|---|---|---|
| Example 1 | Cycloolefin | 40 | 120 | Separate | 10,000 | 9 | 40 |
| Example 2 | Cycloolefin | 40 | 5000 | Separate | 9,100 | 9 | 40 |
| Example 3 | Polycarbonate | 40 | 5000 | Separate | 8,300 | 10 | 47 |
| Example 4 | Cycloolefin | 12 | 5000 | Separate | 40,000 | 8 | 40 |
| Example 5 | Cycloolefin | 70 | 5000 | Separate | 5,500 | 9 | 40 |
| Example 6 | Cycloolefin | 40 | 700 | Separate | 34,000 | 9 | 40 |
| Example 7 | Cycloolefin | 40 | 10000 | Separate | 5,300 | 10 | 40 |
| Example 8 | Cycloolefin | 40 | 5000 | Separate | 35,000 | 8 | 40 |
| Example 9 | Cycloolefin | 40 | 5000 | Separate | 80,000 | 8 | 40 |
| Example 10 | Cycloolefin | 40 | 5000 | Separate | 100,000 | 9 | 40 |
| Example 11 | Cycloolefin | 40 | 5000 | Separate | 110,000 | 9 | 40 |
| Comparative Example 1 | Cycloolefin | 40 | — | — | 120,000 | 9 | 40 |
| Comparative Example 2 | Cycloolefin | 120 | — | — | 81,000 | 11 | 40 |
| Comparative Example 3 | Cycloolefin | — | 5000 | — | 1,100 | 31 | 40 |
| Comparative Example 4 | Polycarbonate | 40 | — | — | 100,000 | 10 | 47 |
| Comparative Example 5 | Polycarbonate | — | 5000 | Separate | 960 | 35 | 47 |
| Comparative Example 6 | Cycloolefin | 40 | 70 | Overlapping | 160,000 | 9 | 40 |
| Comparative Example 7 | Cycloolefin | 7 | 5000 | Separate | 180,000 | 8 | 40 |
| Comparative Example 8 | Cycloolefin | 120 | 5000 | Separate | 4,800 | 12 | 40 |
| Comparative Example 9 | Cycloolefin | 40 | 50000 | Separate | 1,500 | 29 | 40 |
| Comparative Example 10 | Cycloolefin | 40 | 5000 | Separate | 3,900 | 17 | 40 |

Evaluation of the Test Results

Comparisons of the test results for Examples 1 and 2 with those for Comparative Example 1 revealed that in these two Examples the presence of the second inorganic particles was associated with a lower melt viscosity at a temperature of 290° C. Likewise, comparisons of the test results for Examples 2 and 3 with those for Comparative Examples 3 and 5, respectively, indicated that in these two Examples the presence of the first inorganic particles was associated with a smaller surface roughness.

A comparison of the test results for Example 2 with those for Comparative Example 7 revealed that the formed article according to an aspect of the present invention exhibited a lower melt viscosity than one containing smaller first inorganic particles. The formed article prepared in this Example also achieved a small surface roughness.

The formed articles prepared in Examples 2, 8, 9, 10, and 11, which shared the same combination of first and second inorganic particulate components but contained these two components in different proportions, all achieved a low melt viscosity and a small surface roughness.

As can be seen from the foregoing, the resin compositions according to an aspect of the present invention exhibited a melt viscosity low enough for practical thermoforming, and this was because these resin compositions contained first and second inorganic particulate components differing in diameter. In addition to this, the articles formed from these resin compositions had a surface smooth enough for practical applications. Resin compositions according to an aspect of the invention can therefore be used to make mirrors for the components of optical devices, such as those for the scanning unit of multifunction devices or printers.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-122909 filed May 30, 2012, which is hereby incorporated by reference herein in its entirety.

What is claimed is:

1. A formed article comprising:
    a single resin composition containing a thermoplastic resin, first inorganic particles having a mean volume diameter of primary-particle of 10 nm to 100 nm, both inclusive, and second inorganic particles having a mean volume diameter of primary-particle of 120 nm to 10000 nm, both inclusive,
    wherein 100 parts by mass of the single resin composition contains 9.0 to 40.5 parts by mass of the first inorganic particles and 4.5 to 36.0 parts by mass of the second inorganic particles.
2. The formed article according to claim 1,
    wherein the formed article has a mean coefficient of linear expansion of $50 \times 10^{-6}$/° C. or less in a temperature range of 0° C. to 80° C.

3. The formed article according to claim 1,
wherein a surface of the formed article has a root mean square surface roughness (Rq) of 10 nm or less.

4. The formed article according to claim 1,
wherein the first inorganic particles are silica particles, and the second inorganic particles are glass beads.

5. The formed article according to claim 1,
wherein the thermoplastic resin is a cycloolefin resin.

6. The formed article according to claim 1,
wherein a total content of the first and second inorganic particles is in a range of 15 parts by mass to 70 parts by mass.

7. A single resin composition comprising:
a thermoplastic resin;
first inorganic particles having a mean volume diameter of primary-particle of 10 nm to 100 nm, both inclusive; and
second inorganic particles having a mean volume diameter of primary-particle of 120 nm to 10000 nm, both inclusive,
wherein 100 parts by mass of the single resin composition contains 9.0 to 40.5 parts by mass of the first inorganic particles and 4.5 to 36.0 parts by mass of the second inorganic particles.

8. The single resin composition according to claim 7,
wherein the single resin composition has a mean coefficient of linear expansion of $50 \times 10^{-6}/°$ C. or less in a temperature range of 20° C. to 60° C.

9. The single resin composition according to claim 7,
wherein the first inorganic particles and the second inorganic particles are selected from silica particles and glass beads.

10. A mirror comprising:
a formed article made from a single resin composition, the single resin composition containing a thermoplastic resin, first inorganic particles having a mean volume diameter of primary-particle of 10 nm to 100 nm, both inclusive, and second inorganic particles having a mean volume diameter of primary-particle of 120 nm to 10000 nm, both inclusive, 100 parts by mass of the single resin composition containing 9.0 to 40.5 parts by mass of the first inorganic particles and 4.5 to 36.0 parts by mass of the second inorganic particles, and
a reflective layer on an optically effective surface of the formed article.

11. The mirror according to claim 10,
wherein the thermoplastic resin is a cycloolefin polymer.

12. The mirror according to claim 10,
wherein the formed article has a mean coefficient of linear expansion of $50 \times 10^{-6}/°$ C. or less in a temperature range of 0° C. to 80° C.

13. The mirror according to claim 10,
wherein the optically effective surface of the formed article has a root mean square surface roughness (Rq) of 10 nm or less.

14. The mirror according to claim 10,
wherein the first inorganic particles and the second inorganic particles are selected from silica particles and glass beads.

15. The mirror according to claim 10,
wherein when in a volume diameter distribution of the first inorganic particles and the second inorganic particles peak heights of the first inorganic particles and the second inorganic particles are defined as $H_1$ and $H_2$, respectively, a range of a volume diameter of the first inorganic particles at a height of $1/2H_1$ is separate from a range of a volume diameter of the second inorganic particles at a height of $1/2H_2$.

16. The mirror according to claim 10,
wherein the mirror is for use in a scanning unit of a multifunction device.

17. The mirror according to claim 10,
wherein the first inorganic particles are silica particles, and the second inorganic particles are glass beads.

* * * * *